(12) United States Patent
Nishimura (10) Patent No.: US 7,014,562 B2
(45) Date of Patent: Mar. 21, 2006

(54) VIDEO GAME MACHINE AND AFTER-IMAGE DISPLAY METHOD OF VIDEO GAME MACHINE

(75) Inventor: Keisuke Nishimura, Tokyo (JP)

(73) Assignee: Namco Ltd., Tokyo (JP)

( * ) Notice: Subject to any disclaimer, the term of this patent is extended or adjusted under 35 U.S.C. 154(b) by 340 days.

(21) Appl. No.: 10/148,385

(22) PCT Filed: Dec. 1, 2000

(86) PCT No.: PCT/JP00/08499

§ 371 (c)(1),
(2), (4) Date: May 31, 2002

(65) Prior Publication Data

US 2002/0193156 A1 Dec. 19, 2002

(30) Foreign Application Priority Data

Dec. 1, 1999 (JP) ................................ 11-342016

(51) Int. Cl.
*A63F 13/00* (2006.01)
*G06T 15/70* (2006.01)

(52) U.S. Cl. ............................................ 463/31; 463/4
(58) Field of Classification Search ................ 463/1–9, 463/31, 32, 43; 345/418, 419, 426, 427, 345/647, 469.1, 473–475, 706–709, 949, 345/956, 957, 960
See application file for complete search history.

(56) References Cited

U.S. PATENT DOCUMENTS 5,689,437 A * 11/1997 Nakagawa .................. 345/421
5,995,111 A * 11/1999 Morioka et al. ............. 345/592
6,031,568 A * 2/2000 Wakitani ..................... 348/169
6,045,446 A * 4/2000 Ohshima ........................ 463/2
6,203,431 B1 * 3/2001 Miyamoto et al. ............ 463/31
6,322,448 B1 * 11/2001 Kaku et al. .................... 463/32
6,342,886 B1 * 1/2002 Pfister et al. ................ 345/424
6,417,854 B1 * 7/2002 Isowaki et al. ............. 345/473
6,572,475 B1 * 6/2003 Okabe et al. .................. 463/30
6,600,485 B1 * 7/2003 Yoshida et al. ............. 345/419

(Continued)

FOREIGN PATENT DOCUMENTS

JP          07-328228         12/1995

(Continued)

OTHER PUBLICATIONS

"Nintendo Entertainment System" printed from www.nintendo.com/systemclassic?type=nes, Aug. 1985, pp. 1-2.*

(Continued)

*Primary Examiner*—Jessica H. Harrison
(74) *Attorney, Agent, or Firm*—Rabin & Berdo, P.C.

(57) ABSTRACT

An after-image of a ball is displayed on traces of the ball so that each gamer recognizes in which direction and at which speed the shot ball flies. A real ball 30 really exists in a virtual space on a screen and flies from the left to the right in the figure. After-images $31_1$ to $31_4$ of the real ball 30 are displayed at the back of the real ball 30. The after-image $31_2$ is displayed at a position of the real ball 30 before one interval (corresponding to 1/60 sec), the after-image $31_2$ is displayed at a position of the real ball 30 before two intervals, the after-image $31_3$ is displayed at a position of the real ball 30 before three intervals, and the after-image $31_4$ is displayed at a position of the real ball 30 before four intervals. As the after-image is more apart from the real ball 30, the degree of transparency is higher.

12 Claims, 11 Drawing Sheets

U.S. PATENT DOCUMENTS

| | | | |
|---|---|---|---|
| 6,674,877 B1 * | 1/2004 | Jojic et al. | 382/103 |
| 6,757,446 B1 * | 6/2004 | Li et al. | 382/293 |
| 6,767,286 B1 * | 7/2004 | Nagoshi et al. | 463/33 |

FOREIGN PATENT DOCUMENTS

| | | |
|---|---|---|
| JP | WO 97-46295 | 12/1997 |
| JP | 10-188027 | 7/1998 |
| JP | 11-306394 | 11/1999 |

OTHER PUBLICATIONS

"Super Dodge Ball" screenshots produced by CSG Imagesoft/Technos Japan in 1989 and printed from www.screenmania.retrogames.com/nes/01/nes_0002.html, pp. 1-5.*

Feddema et al., "Rapid World Modeling: Fitting Range Data to Geometric Primitives", Apr. 1997 □□.*

* cited by examiner

FIG. 11

VIDEO GAME MACHINE AND AFTER-IMAGE DISPLAY METHOD OF VIDEO GAME MACHINE

TECHNICAL FIELD

The present invention relates to a video game machine in which a gamer operates a character displayed on a display device and, more particularly, to a video game machine suitable to the application to ball sports such as soccer.

BACKGROUND ART

In fields of home video game machines and arcade video game machines, video games for simulating various ball sports become popular as one genre of video games. In the video games, in accordance with the improvement in performance of video game machines, realities of expressions and motions of a player character displayed on a screen are exceedingly improved. Further, in accordance with the advancement of technology of software and various presentations, the video games gain currency among game fan.

In games of ball sports such as futsal, soccer, handball, and basketball, a scene in which a player character shoots a ball is one highlight scene thereof. Also, in a baseball game, a scene in which a hitter sends a hit or blasts a home run is one highlight scene thereof. In these highlight scenes, gamers are excited. The video games are designed to make the gamers excited in the above-mentioned highlight scenes.

The present invention is devised under the above-described background of the art. Accordingly, it is an object of the present invention to provide a new method for making gamers excited in highlight scenes of the foregoing ball sports games and so on.

DISCLOSURE OF THE INVENTION

To accomplish the above object, according to a first invention, there is provided a video game machine in which a gamer operates motion of a character in a virtual space, displayed on a display unit, by using operating means, said video game machine comprising: position information storing means for storing a predetermined number of pieces of position information of a display object in the virtual space, which is specified in contents of a game, with the pieces of position information obtained for predetermined time of period before the present time; status monitoring means for monitoring a status of said display object and determining that the status enters an after-image display status when said display object is in a specific status; calculating means for calculating a motion vector based on the position information stored in said position information storing means when the status of said display object enters the after-image display status and calculating at least one of the amount of deformation of said display object, the direction of said display object after deformation, and the degree of transparency at each position based on said motion vector; and display control means for displaying the after-image of said display object at the, position of said display object at past time, which is stored in said position information storing means, based on the result obtained by said calculating means.

To accomplish the above object, according to a second invention, in the video game machine of the first invention, the game contents correspond to a ball sport game for racing score or determining the outcome of a race, said display object is a pseudo ball for the ball sport displayed on the display unit, said specific status is a status in which a player character makes a, predetermined motion to said ball, and, said calculating means calculates the amount of deformation of said ball, the direction of the ball after deformation, and the degree of transparency at each position, based on said motion vector.

To accomplish the above object, according to a third invention, there is provided an after-image display method in a video game machine, said video game machine wherein a gamer operates motion of a character in a virtual space, displayed on a display unit, by using operating means, said method for displaying an after-image of a display object specified in game contents of the video game machine, comprising: a position information storing step of storing a predetermined number of pieces of position information of said display object in the virtual space, with the pieces of position information obtained for predetermined time of period before the present time; a calculating step of calculating a motion vector based on the position information stored in said position information storing step when said display object is in an after-image display status and calculating at least one of the amount of deformation of said display object, the direction of said display object after deformation, and the degree of transparency at each position based on said motion vector; and an after-image display step of displaying the after-image of said display object at the position of said display object at past time, which is stored in said position information storing step, based on the result obtained in said calculating step.

To accomplish the above object, according to a fourth invention, in the after-image display method in a video game machine of the third invention, the game contents correspond to a ball sport game for racing score or determining the outcome of a race, said display object is a pseudo ball for the ball sport displayed on the display unit, and, the amount of deformation of said ball, the direction of the ball after deformation, and the degree of transparency at each position are calculated based on said motion vector in said calculating step.

To accomplish the above object, according to a fifth invention, there is provided a computer-readable recording medium for recording a program of a video game in which a gamer operates motion of a character in a virtual space, displayed on a display unit, by using operating means, wherein said medium records a program which allows a computer to implement: a position information storing function for storing a predetermined number of pieces of position information of a display object in the virtual space, which is specified in contents of a game, with the pieces of positon information obtained for, predetermined time of period before the present time; a status monitoring function for monitoring a status of said display object and determining that the status enters an after-image display status when said display object is in a specific status; a calculating function for calculating a motion vector based on the position information stored in said position information storing function when the status of said display object enters the after-image display status and calculating at least one of the amount of deformation of said display object, the direction of said display object after deformation, and the degree of transparency at each position based on said motion vector; and a display control function for displaying the after-image of said display object at the position of said display object at past time, which is stored in said position information storing funciton, based on the result obtained by said calculating funciton.

To accomplish the above object, according to a sixth invention, in the computer-readable recording medium of the fifth invention, the game contents correspond to a ball sport game for racing score or determining the outcome of a race, said display object is a pseudo ball for the ball sport displayed on the display unit, said specific status is a status in which a player character makes a predetermined motion to said ball, and, the amount of deformation of said ball, the direction of the ball after deformation, and the degree of transparency at each position are calculated based on said motion vector in said calculating function.

BEST MODE FOR CARRYING OUT THE INVENTION

There will be described hereinafter the best mode for carrying out the invention according to the present application with reference to the drawings.

Figure 1:
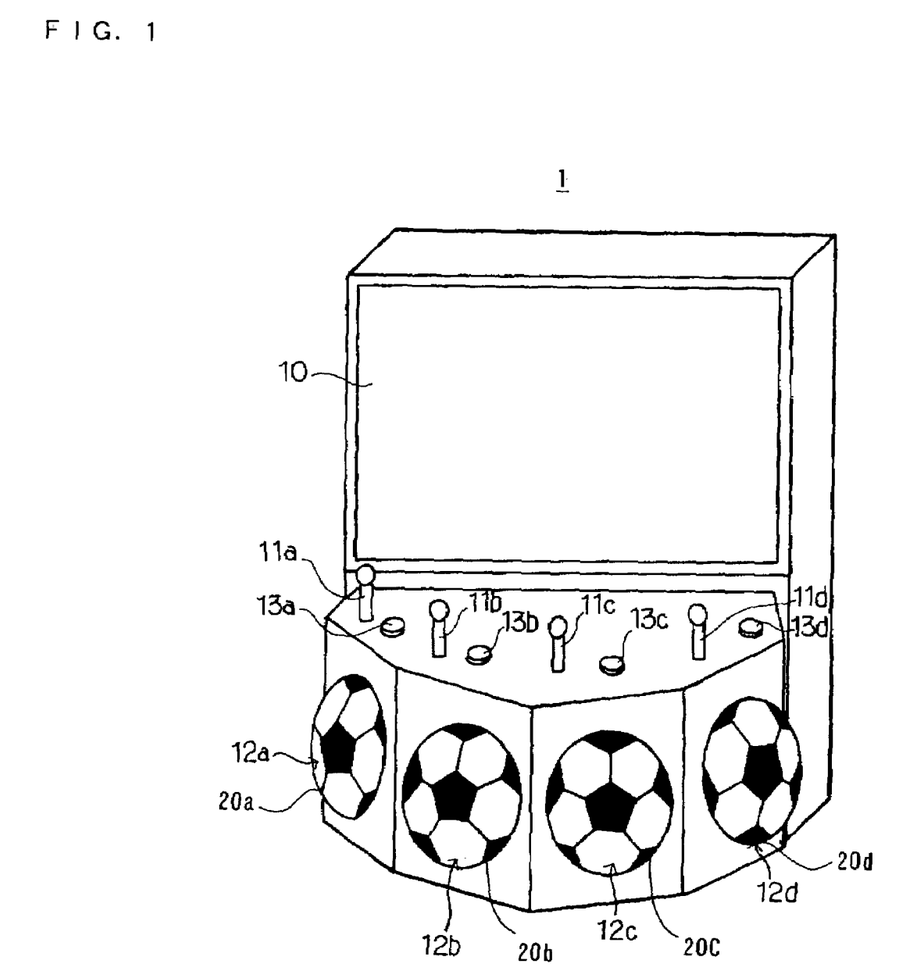
FIG. 1 is a perspective view showing the appearance of the overall sport video game machine.
Figure 2:
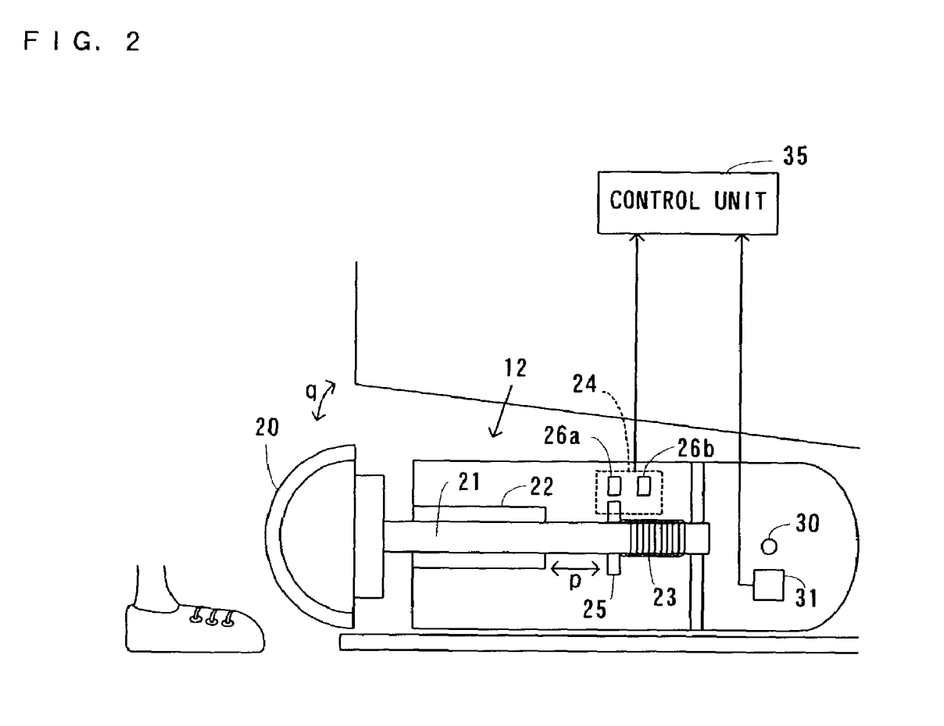
FIG. 2 is a cross-sectional view showing the structure of a kick input unit of the sport video game machine shown in FIG. 1.

Before description of a main portion of the present invention, the outline of a video game of a sport video game machine will be described with reference to FIGS. 1 and 2. FIG. 1 is a perspective view showing the appearance of the overall sport video game machine, and FIG. 2 is a cross-sectional view showing the structure of a kick input unit of the sport video game machine shown in FIG. 1.

A sport video game machine 1 in FIG. 1 is a video game machine of a game dedicated for simulating futsal as a sport which is small-scaled soccer. A team of a player character on a screen can be discriminated depending on a uniform wear. Each team contains five player characters and gamers operate four player characters except for a goal keeper. Hereinafter, the player character represented on a screen is simply referred to as a "player".

In the video game machine 1 in FIG. 1, maximum four gamers can play the video game. Each gamer operates the motion of one player in a field assigned thereto. If the number of the gamers is three or less, an operation of the player, which is not operated by the gamer, is controlled by a CPU in accordance with a predetermined algorithm. Incidentally, the CPU always controls a goal keeper.

The video game machine 1 comprises a screen 10 for displaying a moving image or a still image of contents of the game and other necessary items at a position which is determined in consideration of the height of gamer's eye. During a play time of the game, in principle, an image in the field, which is displayed on the screen 10, indicates an image when the field is looked down in a oblique direction from the side.

An operating unit under the screen 10 comprises four operating panels a, b, c, and d in consideration of the case of a play operation of the four gamers. The operating panels a, b, c, and d have levers 11 (11a, 11b, 11c, and 11d), kick input units 12 (12a, 12b, 12c, and 12d), and buttons 13 (13a, 13b, 13c, and 13d), respectively. Each gamer stands before his own operating panel and operates the lever 11, the kick input unit 12, and the button 13.

When the operated player simply moves or keeps and dribbles a ball, instruction contents, which are operated by the lever 11, include a moving direction or a moving speed of the player. When the operated player kicks the ball to pass or shoot the ball, the instruction contents include a fly direction of the kicked ball.

In the video game machine 1, an analog lever is used as the lever 11. In the analog lever, two volumes (an x-volume and a y-volume) having resistances changed depending the rotations of shafts thereof, are arranged so that the shafts are perpendicular to each other. The bottom of shaft of the lever 11 is connected to the shafts of the x-volume and the y-volume by a gear or the like. The shafts of the x-volume and the y-volume are rotated in accordance with an inclined direction of the lever 11 and an angle of inclination thereof. If the lever 11 is inclined in the x-axis direction or (−x)-axis direction (in the horizontal direction), only the x-volume is rotated. If the lever 11 is inclined in the y-axis direction or (−y)-direction (in the vertical direction), only the y-volume is rotated. Further, if the lever 11 is inclined in any direction other than the above-mentioned directions, both the x-volume and the y-volume are rotated corresponding to the amount of inclinations thereof. The CPU always detects the resistances of the x-volume and the y-volume at predetermined intervals, as will be described later. The CPU calculates vectors based on the resistances and recognizes the inclined angle and direction of the lever 11. In accordance with continuous change in the inclined angle and inclined direction of the lever 11, rotational angles of the shafts and the resistances of the x-volumes and the y-volume are continuously changed. Therefore, the CPU continuously recognizes the inclined direction and inclined angle.

The kick input unit 12 is provided at a lower portion of the video game machine 1. Mainly, operations of the kick input unit 12 are instructions for starting operations such as pass, shoot and sliding tackle which are made by the operated player and speed control of the ball kicked through the pass and the shoot. The kick input unit 12 comprises a ball unit 20 for kicking the ball by gamer's foot like the actual futsal or soccer. The ball unit 20 is hemispherical with substantially the same dimension and pattern of an actual futsal ball. A material similar or substantially similar to the futsal ball is used as a material of the surface of the ball unit 20.

As shown in FIG. 2, a stick shaft 21 is provided at the back of the ball unit 20. The hemispherical ball unit 20 is fixed at the left end of the shaft 21. The shaft 21 is supported by a bearing 22 and can be moved in a direction shown by an arrow p (in the horizontal direction). The shaft 21 is inserted in a spring 23. One end of the spring is fixed to the shaft 21 and the other end thereof is fixed to the main body of the video game machine. The spring 23 energizes the shaft 21 in the left direction of FIG. 2. As a consequence, in a normal status, the ball unit 20 and the shaft 21 are located at the leftmost position within a moving range. A hemispherical portion of the ball unit 20 is projected from a lower portion of the video game machine to be opposed to the toe of the gamer, as shown in FIG. 1.

When the gamer kicks the ball unit 20 in the kick input unit 12, the ball unit 20 and the shaft 21 are moved in the right direction (in the direction toward the back of the video game machine) in FIG. 2 at a speed corresponding to kick power. However, if the ball unit 20 and the shaft 21 are moved at some degree, repulsive power of the spring 23 is increased and the ball unit 20 and the shaft 21 are returned to the original position. In this case, a stroke for displacing the ball unit 20 becomes longer as the gamer kicks the ball more strongly.

The kick input unit 12 comprises a speed sensor 24 for detecting the displacing speed of the shaft 21. The speed sensor 24 comprises a reflecting member 25 which is mounted on the shaft 21, and two optical sensors 26a and 26b provided along a longitudinal direction of the shaft 21. The displacing speed of the shaft 21 is calculated based on time for which the reflecting member 25 passes between the optical sensors 26a and 26b. In the video game machine 1, the speed sensor 24 measures the displacing speed of the shaft 21 and sends the measured value to the CPU. A signal transmitted to the CPU is used for the speed control of the ball which is kicked and moved on the screen and for the determination whether gamer's kick operation is shoot or pass.

The ball displayed on the screen 10 is kicked or headed by the player, thereby moving in/out of the field. The kick speed of the ball unit 20 and the kick direction of the ball by the operation of the lever 11 are substituted for a dynamic equation of motion and, thus, a three-dimensional position of the ball is calculated. A moving image of the ball is displayed on the screen 10 based on the calculation result. A coordinate system as a base of the calculation is an orthogonal coordinate system in which a horizontal direction on the screen is x-axis, a vertical direction on the screen is y-axis, and a depth direction on the screen is z-axis.

Next, a description is given of an operation for displaying an after-image of the shot ball, as a "display object" in claims, which corresponds to a main portion of the present invention. One highlight scene of the video game machine is a scene in which when one team advances to and attacks another team in a virtual space displayed on a display unit, a gamer who operates the character which keeps the ball determines the direction of the ball by operating the lever 11, and then the ball unit 20 is strongly kicked and shot. In the scene, the most interested subject for all gamers is in which direction and at which speed the ball is shot, and the gamers are more excited depending on a status of the shot ball.

Figure 3:
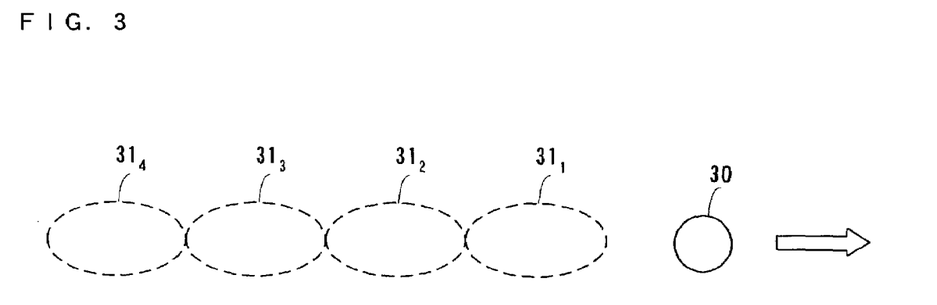
FIG. 3 is a diagram showing an example of a status in which an after-image of a ball is displayed on traces of the shot ball.

Then, in the video game machine 1, the after-image is displayed on the trace of the ball so that each gamer can promptly recognize in which direction and at which speed the ball is shot. FIG. 3 shows an example of a status in which the after-image is displayed. Referring to FIG. 3, a ball 30 is a ball which really exists in the virtual space on the screen (hereinafter, referred to as a "real ball"). In this case, the ball 30 flies from the left to the right in FIG. 3. At the back of the ball 30, after-images $31_1$ to $31_4$ of the real ball 30 are displayed. The after-image $31_1$ is displayed at a position of the real ball 30 before one interval (corresponding to 1/60 sec), the after-image $31_2$ is displayed at a position of the real ball 30 before two intervals, the after-image $31_3$ is displayed at a position of the real ball 30 before three intervals, and the after-image $31_4$ is displayed at a position of the real ball 30 before four intervals. As the after-image is closer to the real ball 30, the degree of transparency is lower, and as it is more apart from the real ball 30, it is higher. After one interval from the status in FIG. 3, the real ball 30 is moved toward the right and the after-image $31_4$ at the most apart position from the real ball 30, with the highest degree of transparency, disappears from the screen. A new after-image is displayed at the position where the real ball 30 in FIG. 3 exists before one interval.

Figure 4:
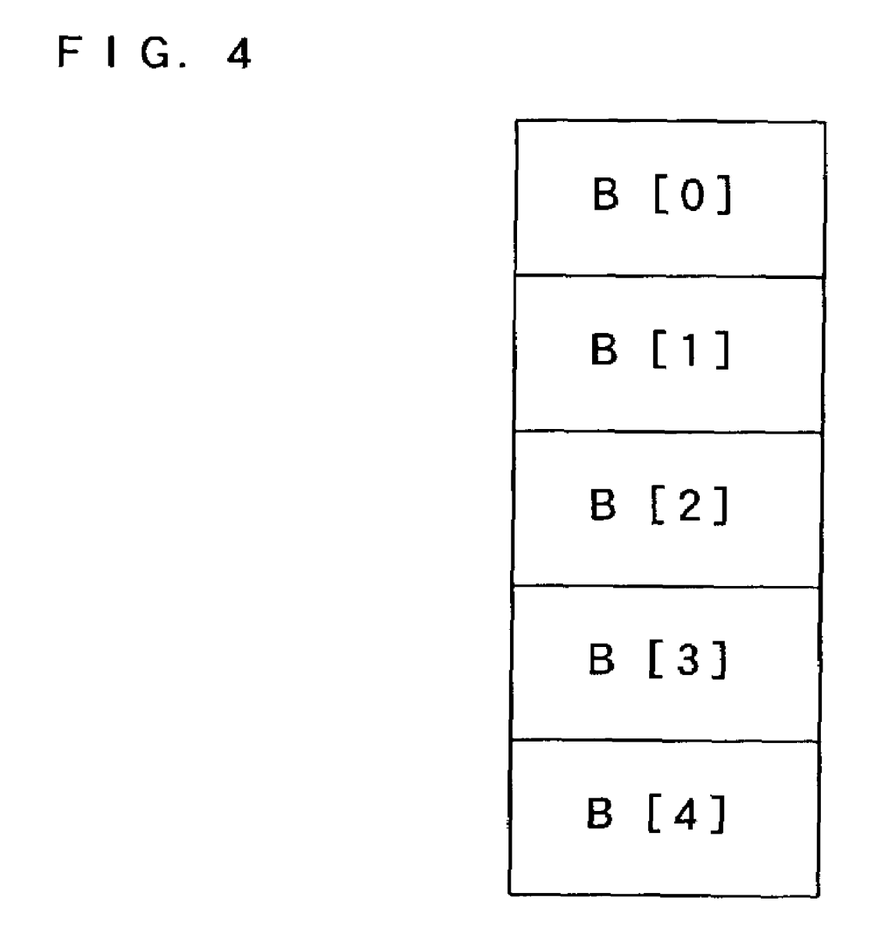
FIG. 4 is a diagram schematically showing a buffer as position information storing means.
Figure 5:
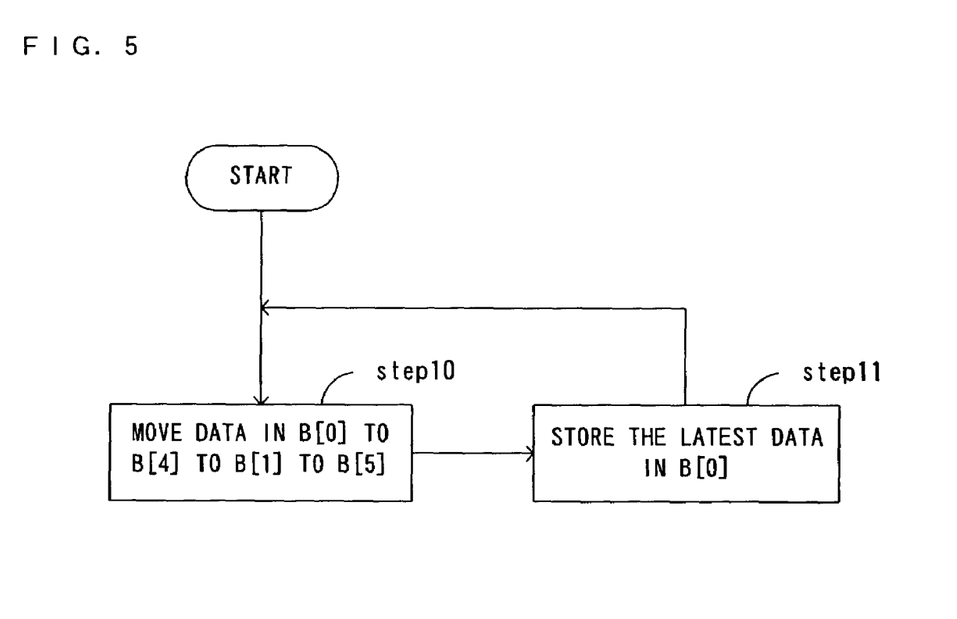
FIG. 5 is a flowchart showing processing for storing data in the buffer.

A description is given of a specific method for displaying the after-image shown in FIG. 3. As mentioned above, the three-dimensional coordinate of the real ball 30 displayed on the screen is calculated every interval. The video game machine 1 comprises a buffer for storing values of the real ball 30, which were obtained for five intervals before the present time on the three-dimensional coordinate. The buffer corresponds to "position information storing means" in claims. FIG. 4 is a diagram schematically showing the buffer, and FIG. 5 is a flowchart showing processing for storing data in the buffer.

The buffer shown in FIG. 4 is an FIFO buffer having five storing areas B[0] to B[4], for storing data of the real ball 30, which was obtained for five intervals before the present time on the three-dimensional coordinate. As shown in FIG. 5, data in the areas B[0] to B[3] is moved to the areas B[1] to B[4] in the buffer, respectively, every interval (step 10), and the latest data of the real ball 30, which is newly calculated, is stored in the area B[0] every interval (step 11). The data in the area B[4] is erased every movement of the data. The processing shown in FIG. 5 is always executed during the game play, irrespective of a status in which the real ball 30 is shot or not. Although the FIFO buffer corresponds to "the position information storing means" in claims, other elements can be used as the position information storing means.

When the ball is in the shooting status, the data on the three-dimensional coordinate, which is stored in the FIFO buffer in FIG. 4, is subjected to processing for displaying the after-image on the trace of the ball 30. Incidentally, the CPU (refer to FIG. 2) monitors the status of the ball, calculates image data which is the after-image of the shot ball, and displays the image data based on the calculation.

Figure 6:
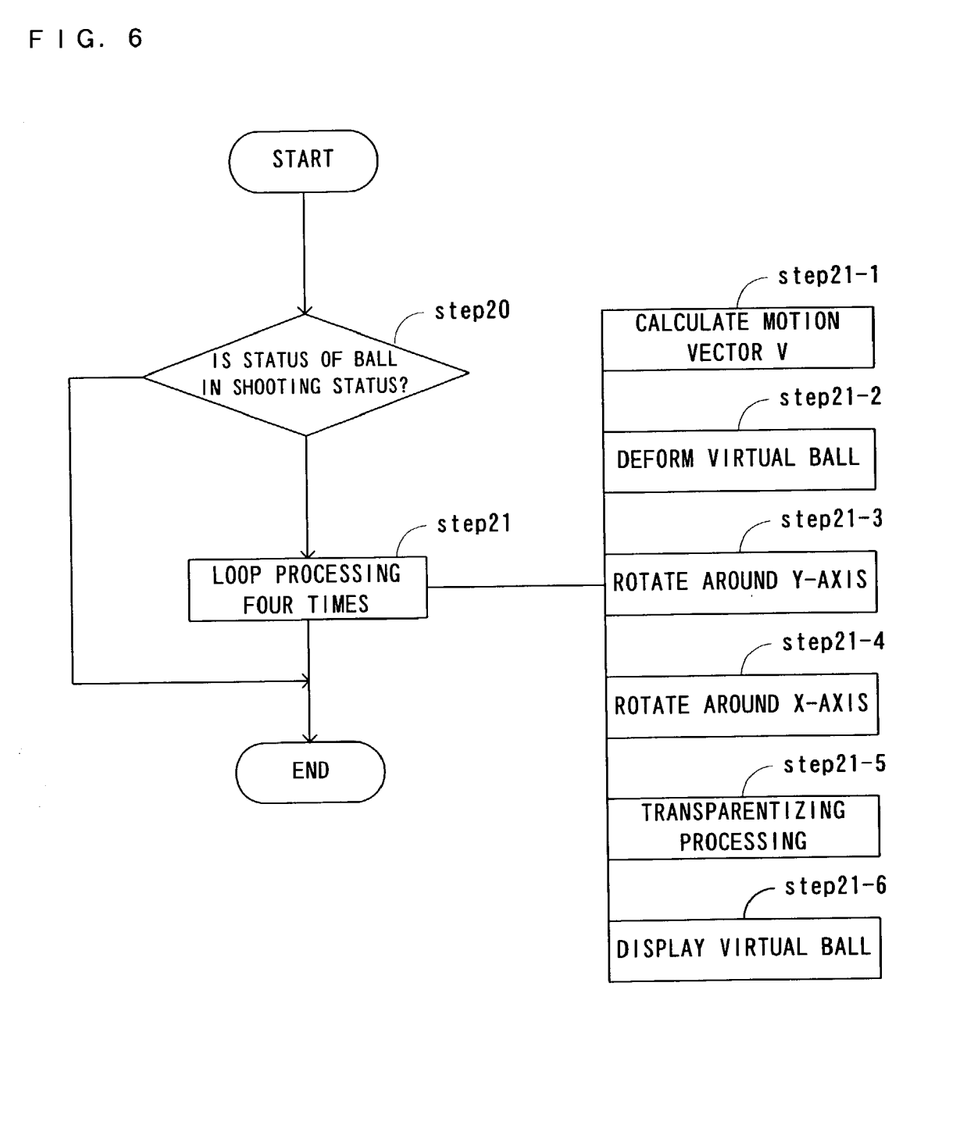
FIG. 6 is a flowchart showing processing for displaying an after-image.

FIG. 6 is a flowchart showing the processing for displaying the after-image. As shown in FIG. 6, if it is determined in step 20 that the status of the ball enters the shooting status, the processing in step 21 is executed. The processing in step 21 comprising processing in steps 21-1 to 21-6 is executed the number of times which is obtained by subtracting the number of storing areas in the buffer by 1. As shown in FIG. 4, the buffer contains the five storing areas B[0] to B[4] used here and, therefore, the processing in steps 21-1 to 21-6 is executed four times.

Figure 7:
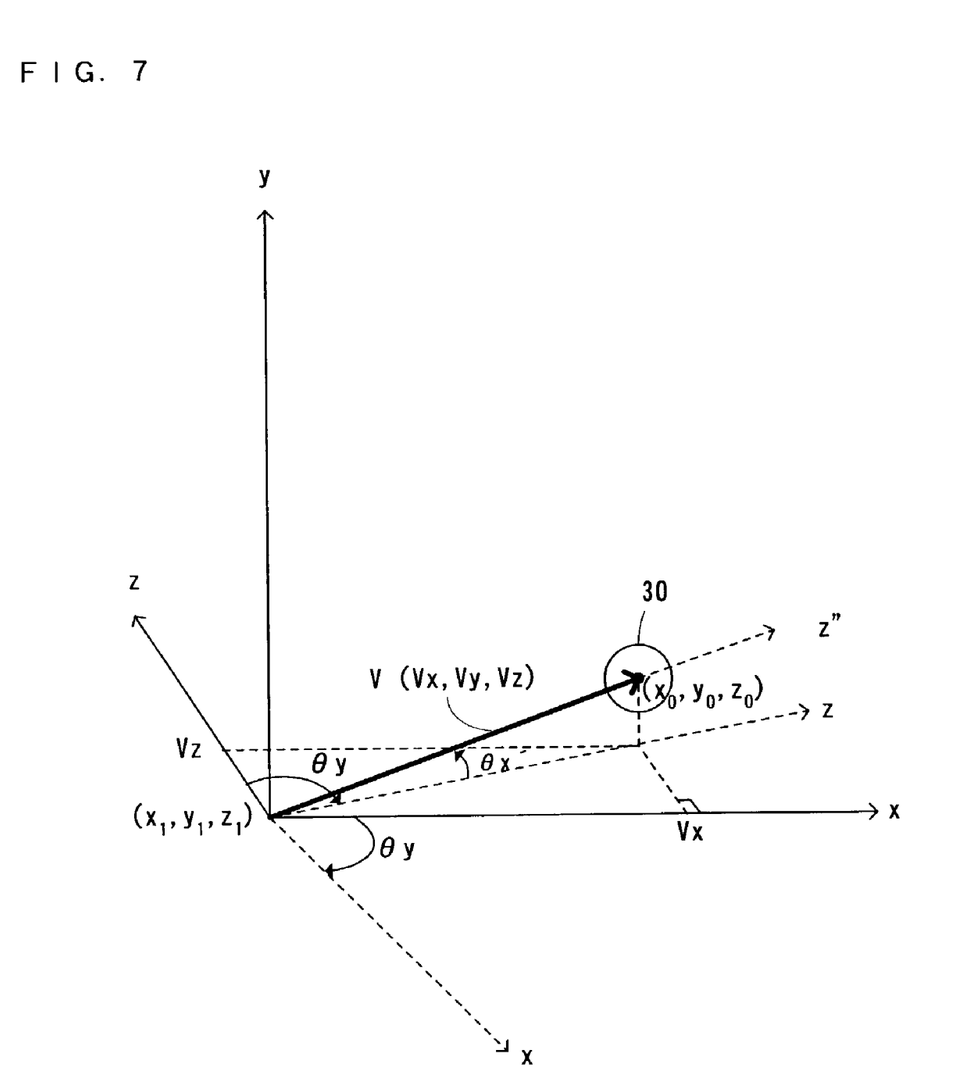
FIG. 7 is a diagram showing a relationship between a three-dimensional coordinate of a real ball 30 at the present time and a three-dimensional coordinate for displaying an after-image of the real ball before one interval, and a motion vector V under the condition of the relationship.

A description is given of processing contents in FIG. 6 hereinbelow with reference to FIGS. 7 to 11. FIG. 7 is a diagram showing a relationship between a three-dimensional coordinate $(x_0, y_0, z_0)$ of the real ball 30 at the present time and a three-dimensional coordinate $(x_1, y_1, z_1)$ for displaying the after-image of the real ball 30 before one interval while the three-dimensional coordinate $(x_1, y_1, z_1)$ of the ball before one interval is the origin. The real ball 30 is shown at the three-dimensional coordinate $(x_0, y_0, z_0)$ at the present time. Incidentally, the three-dimensional coordinate $(x_0, y_0, z_0)$ is stored in the buffer area B[0] shown in FIG. 4 and the three-dimensional coordinate $(x_1, y_1, z_1)$ is stored in the buffer area B[1] at the present time.

First, a difference between the three-dimensional coordinate $(x_1, y_1, z_1)$ of the real ball 30 before one interval and the three-dimensional coordinate $(x_0, y_0, z_0)$ at the present time is calculated, thereby obtaining a vector $(x_1-x_0, y_1-y_0, z_1-z_0)$ (step 21-1). This vector indicates the moving direction and the moving speed of the ball and is referred to a "motion vector V". The component of the motion vector V is $(V_x, V_y, V_z)$. In other words, the following is established.

$$V_x = x_1 - x_0$$

$$V_y = y_1 - y_0$$

$$V_z = z_1 - z_0$$

Figure 8:
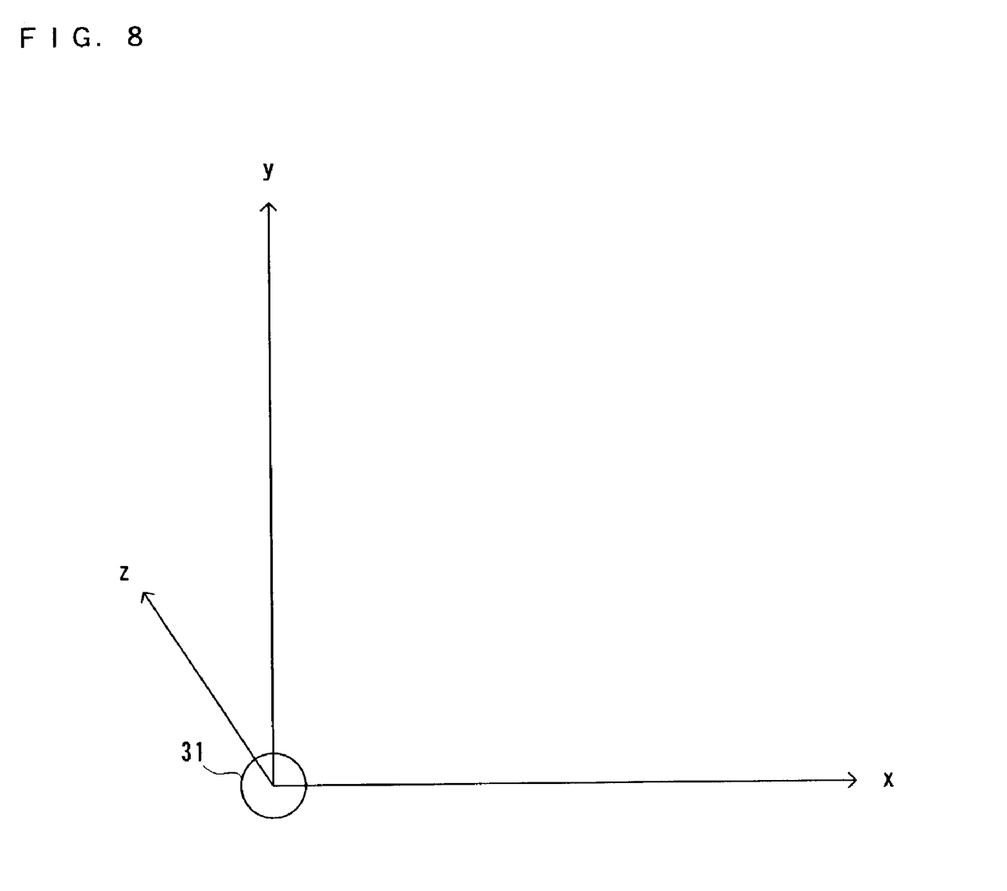
FIG. 8 is a diagram showing a virtual ball whose center is positioned at the origin on the three-dimensional coordinate of the ball before one interval.

Next, as shown in FIG. 8, the center of the virtual ball 31 is placed at the three-dimensional coordinate $(x_1, y_1, z_1)$ of the real ball 30 before one interval, and the dimension of the virtual ball 31 is subjected to deformation to be spread or compressed in the z-axis direction (step 21-2). Specifically speaking, the shape of the virtual ball 31 is changed so that the length of the virtual ball 31 in the z-axis direction is a half value of |V| corresponding to the size of the motion vector V, that is, $$(\tfrac{1}{2}) \cdot (V_x^2 + V_y^2 + V_z^2)^{1/2}.$$

Figure 9:
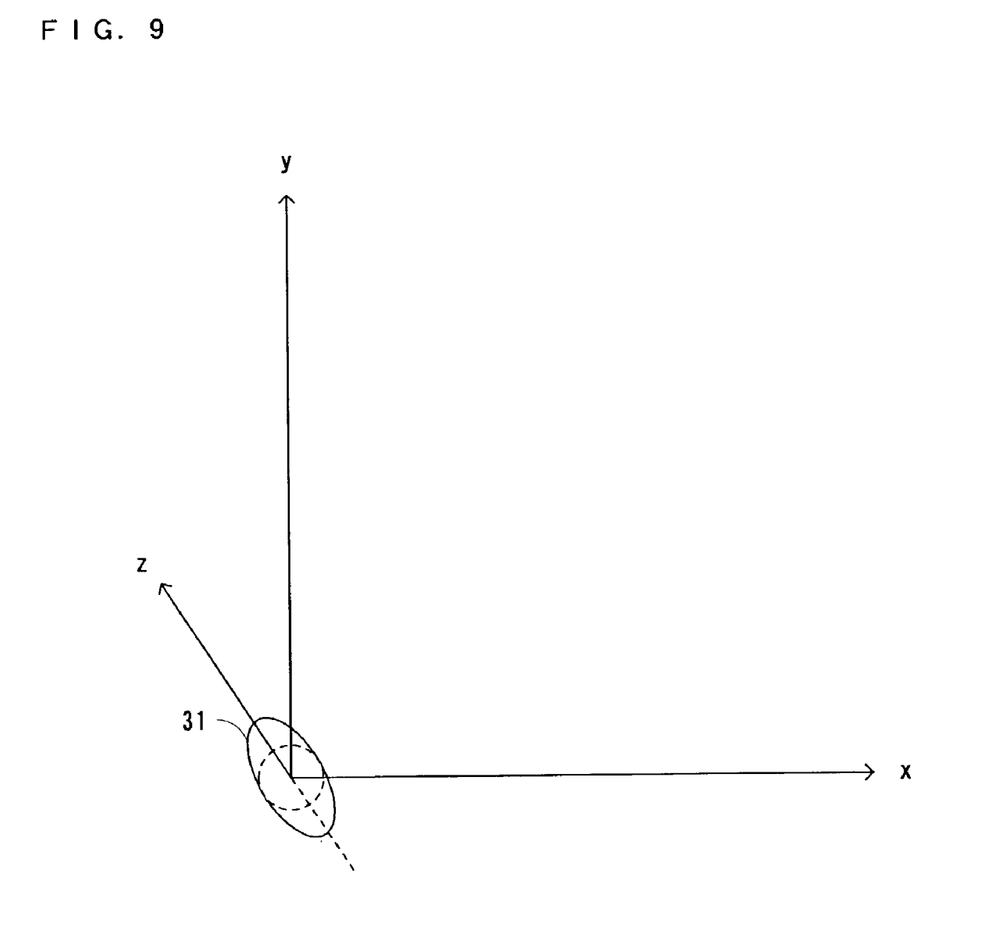
FIG. 9 is a diagram showing a status in which the virtual ball shown in FIG. 8 is subjected to deformation.

FIG. 9 is a diagram showing the status of the virtual ball 31 after deformation. As shown in FIG. 9, the virtual ball 31 after deformation is ellipsoid of revolution whose major axis (parallel with the z-axis) becomes longer as the motion speed of the real ball 30 is higher.

Subsequently, the overall of the coordinate system in FIG. 9, including the deformed virtual ball 31, is rotated around the y-axis by a $\theta_y$ angle (refer to FIG. 7) (step 21-3). The $\theta_y$ angle is obtained by the following equation.

$$\theta_y = \tan^{-1}\{V_x/V_z\}$$

Figure 10:
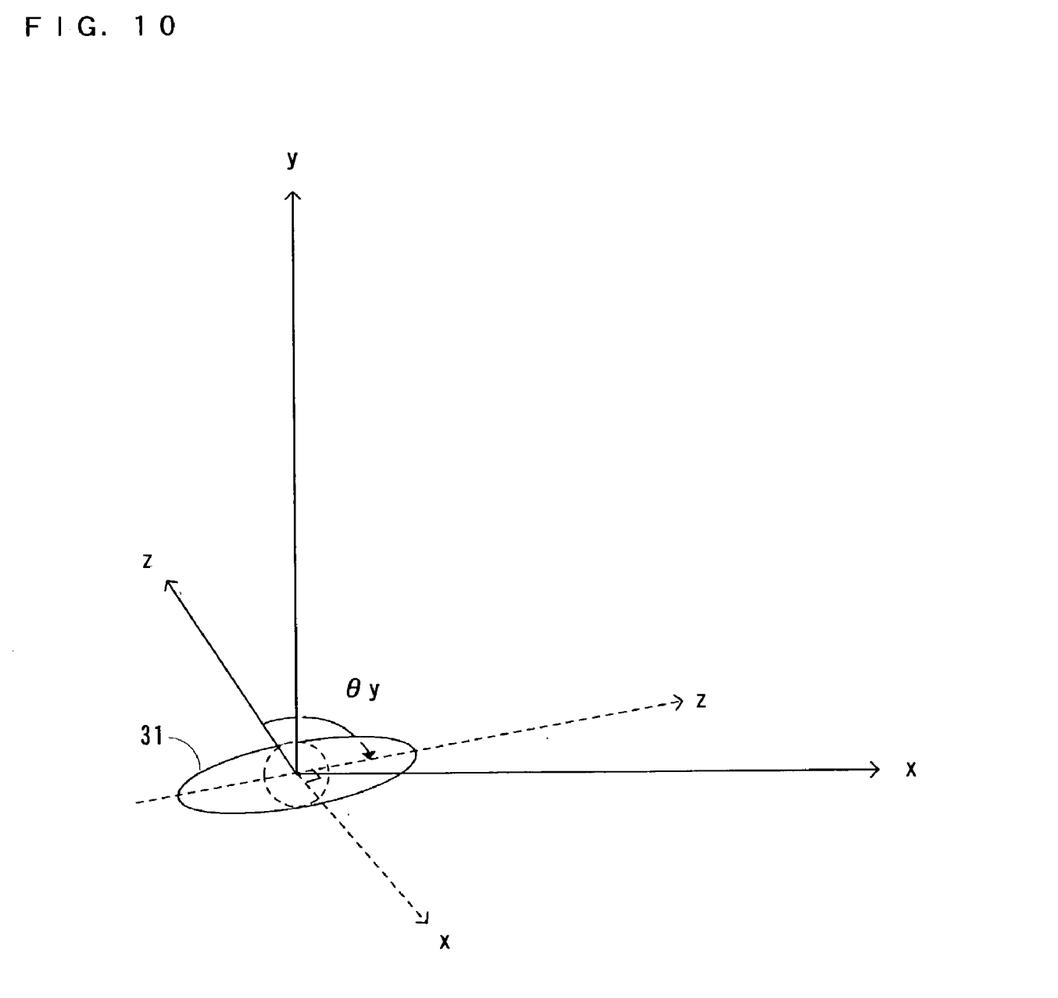
FIG. 10 is a diagram showing a status in which the overall of the coordinate system in FIG. 9 including the deformed virtual ball is rotated around y-axis by an angle $\theta_y$.

FIG. 10 is a diagram showing the status of the virtual ball 31 after rotation. As a result of rotation, as shown in FIG. 10, the x-axis shifts to x'axis and the z-axis parallel with the major axis of the virtual ball 31 shifts to z'axis.

Further, the overall coordinate system is rotated around the x'-axis by a $\theta_{x'}$ angle (refer to FIG. 7), from the status shown in FIG. 10 (step 21-4). The $\theta_{x'}$ angle is obtained by the following expression.

$$\theta_{x'} = \tan^{-1}\{V_y/(V_x^2+V_z^2)^{1/2}\}$$

Figure 11:
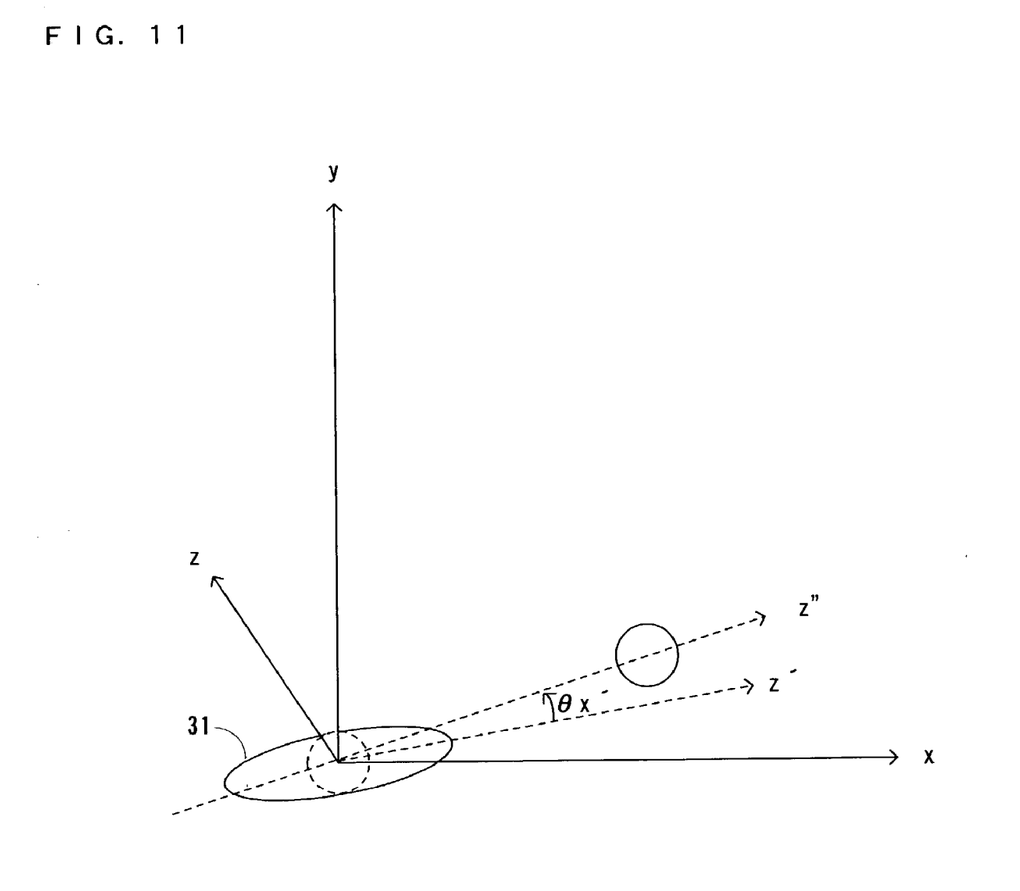
FIG. 11 is a diagram a status in which the overall of the coordinate system is rotated around x'-axis by an angle $\theta_{x'}$ from the status shown in FIG. 10.

As a result of rotation, the z'-axis shifts to z"-axis as shown in FIG. 11. The major axis of the virtual ball 31 is parallel with the motion vector V and the virtual ball 31 is oriented just in the direction of the real ball 30. Incidentally, the one method for calculating the $\theta_y$ angle and the $\theta_{x'}$ angle mentioned above is one example, another calculating method, which is mathematically equivalent to the one method, may be adopted.

Next, the virtual ball 31 having the major axis parallel with the motion vector V is subjected to transparentizing processing (step 21-5). As the time is more previous, the degree of transparency is linearly increased.

Based on the result of the processing in steps 21-1 to 21-5, the virtual ball 31 is displayed at the three-dimensional coordinate $(x_1, y_1, z_1)$ of the real ball 30 before one interval (step 21-6). Further, the processing in steps 21-1 to 21-6 is performed at the three-dimensional coordinate $(x_2, y_2, z_2)$ of the real ball 30 before two intervals, the three-dimensional coordinate $(x_3, y_3, z_3)$ of the real ball 30 before three intervals, the three-dimensional coordinate $(x_4, y_4, z_4)$ of the real ball 30 before four intervals, and the three-dimensional coordinate $(x_5, y_5, z_5)$ of the real ball 30 before five intervals, respectively. In this case, the motion vector V at each three-dimensional coordinate is calculated by using a difference between each three-dimensional coordinate and a three-dimensional coordinate after one interval.

Consequently, as shown in FIG. 3, the screen displays the series of the four virtual balls $31_1$ to $31_4$ at the back of the real ball 30. As the speed in the case of kicking the ball unit 20 by the gamer's foot is higher, that is, as the moving speed of the real ball shot on the screen is higher, the degree of flatness of the shape of the after-image is increased. The degree of flatness of the shape of the after-image expresses the speed of the ball. As the virtual balls $31_1$ to $31_4$ are more apart from the real ball 30, they have a higher degree of transparency. The virtual balls $31_1$ to $31_4$ sequentially disappear in accordance with the movement of the real ball 30, starting from the virtual ball $31_4$ which is most apart from the real ball 30. The gamer sees as if the virtual balls are after-images which represent the traces of the shot ball.

By using the after-image, the gamer can promptly recognize not only a fact that the ball is shot but also the trace of the ball. In addition, in the scene of the shoot in which the gamer is most excited during playing the game, advantageously, the atmosphere of the game is warmed up.

The present invention is not limited to the above embodiment and can be variously modified within the spirit of the invention. Although the number of the virtual balls which are displayed as the after-images is e.g., four in the description, it is not limited to this. Although the length of the virtual ball 31 in the z-axis is half size of the motion vector V in step 21-2 in FIG. 8, it is not limited to this. Moreover, although the present invention is applied to the video game machine of a game dedicated for the futsal in the above embodiment, it can be applied to video game machines of ball sports such as soccer, handball, basketball, and baseball and to video game, machines in which a status of fast movement of an automobile, a rocket, or the like is emphasized.

In addition, the present invention can be embodied by recording a computer program of the above-described game contents to a recording medium. The recording medium includes a magnetic tape, a flexible disk, an optical disk such as a CD-ROM or DVD, a magneto-optical disk such as an MO, etc.

As stated above, in the case in which the present invention is applied to, for example, a futsal game, when a game status enters a specific status in which a ball as a display object is shot, image data as an after-image of the ball is obtained and displayed based on a predetermined calculation method. As a consequence, a gamer can promptly recognize not only a fact that the ball is shot but also the advancing speed and direction of the ball, by seeing the after-image. Further, the after-image is displayed in a main highlight scene in the game such as a shoot scene, thus enabling the atmosphere of excited gamers to effectively be warmed up.

INDUSTRIAL APPLICABILITY

As described above, the video game machine according to the present invention can be used for wide fields of arcade video games which are installed to arcade game amusement center, etc.

What is claimed is:

1. A video game machine in which a gamer operates motion of a character in a virtual space, displayed on a display unit, by using operating means, said video game machine comprising:

position information storing means for storing a predetermined number of pieces of position information of a display object in the virtual space, which is specified in contents of a game, with the pieces of position information obtained for predetermined time of period before the present time;

status monitoring means for monitoring a status of said display object and determining that the status enters an after-image display status when said display object is in a specific status;

calculating means for calculating a motion vector based on the position information stored in said position information storing means when the status of said display object enters the after-image display status and calculating an amount of deformation of said display object along a direction of said motion vector; and display control means for displaying the after-image of said display object at the position of said display object at past time, which is stored in said position information storing means, based on the result obtained by said calculating means.

2. The video game machine according to claim 1, wherein the game contents correspond to a ball sport game said display object is a pseudo ball for the ball sport displayed on the display unit, said specific status is a status in which a player character makes a predetermined motion to said ball, and, said calculating means calculates the amount of deformation of said ball, a direction of the ball after deformation, and a degree of transparency at each position, based on said motion vector.

3. The video game machine according to claim 1, wherein said calculating means calculates a degree of transparency at each position of said display object, based on said motion vector.

4. An after-image display method in a video game machine, said video game machine wherein a gamer operates motion of a character in a virtual space, displayed on a display unit, by using operating means, said method for displaying an after-image of a display object specified in game contents of the video game machine, comprising:

a position information storing step of storing a predetermined number of pieces of position information of said display object in the virtual space, with the pieces of position information obtained for predetermined time of period before the present time;

a calculating step of calculating a motion vector based on the position information stored in said position information storing step when said display object is in an after-image display status and calculating an amount of deformation of said display object along a direction of said motion vector; and an after-image display step of displaying the after-image of said display object at the position of said display object at past time, which is stored in said position information storing step, based on the result obtained in said calculating step.

5. The after-image display method in a video game machine according to claim 4, wherein the game contents correspond to a ball sport game, said display object is a pseudo ball for the ball sport displayed on the display unit, and, the amount of deformation of said ball, a direction of the ball after deformation, and a degree of transparency at each position are calculated based on said motion vector in said calculating step.

6. The after-image display method in a video game machine according to claim 4, wherein said calculating means calculates a degree of transparency at each position of said display object, based on said motion vector.

7. A computer-readable recording medium for recording a program of a video game in which a gamer operates motion of a character in a virtual space, displayed on a display unit, by using operating means, wherein said medium records a program which allows a computer to implement: a position information storing function for storing a predetermined number of pieces of position information of a display object in the virtual space, which is specified in contents of a game, with the pieces of position information obtained for predetermined time of period before the present time;

a status monitoring function for monitoring a status of said display object and determining that the status enters an after-image display status when said display object is in a specific status;

a calculating function for calculating a motion vector based on the position information stored in said position information storing function when the status of said display object enters the after-image display status and calculating an amount of deformation of said display object along a direction of said motion vector; and a display control function for displaying the after-image of said display object at the position of said display object at past time, which is stored in said position information storing function, based on the result obtained by said calculating function.

8. The computer-readable recording medium according to claim 7, wherein the game contents correspond to a ball sport game, said display object is a pseudo ball for the ball sport displayed on the display unit, said specific status is a status in which a player character makes a predetermined motion to said ball, and, the amount of deformation of said ball, a direction of the ball after deformation, and a degree of transparency at each position are calculated based on said motion vector in said calculating function.

9. The computer-readable recording medium according to claim 7, wherein said calculating means calculates a degree of transparency at each position of said display object, based on said motion vector.

10. A video game machine in which a gamer controls motion of an object in a virtual space and the object is displayed on a display unit, said video game machine comprising:

an information input device inputting at least one of an initial object speed selected by the gamer and an initial object direction selected by the gamer;

calculating means for calculating from speed and direction of the object a deformation of the object in the virtual space, the deformation being along the direction, and for determining from the initial object speed and the initial object direction an initial motion of the object in the virtual space; and display control means for displaying at least one after-image of said display object along a trajectory of said display object where the object earlier was located in the virtual space; wherein the after-image is subjected to the deformation.

11. The video game machine according to claim 10, wherein the object is a ball and the deformation transforms the ball into an ellipsoid of revolution having a longest axis parallel to the direction of the object.

12. The video game machine according to claim 11, wherein a length of the longest axis of the ellipsoid of revolution is proportional to the object speed.

* * * * *